United States Patent
Krusche

[15] 3,685,290
[45] Aug. 22, 1972

[54] OVERLOAD SYSTEM FOR A HYDROSTATIC-DRIVE APPARATUS

[72] Inventor: Alfred Krusche, Grossostheim, Germany

[73] Assignee: Linde Aktiengesellschaft, Wiesbaden, Germany

[22] Filed: March 15, 1971

[21] Appl. No.: 124,157

[30] Foreign Application Priority Data

April 10, 1970 Germany..........P 20 17 272.9

[52] U.S. Cl. ..............60/53 WW, 60/52 VS, 91/461
[51] Int. Cl. ............................B66d 1/08, B66d 5/00
[58] Field of Search.......60/53 WW, 52 VS, DIG. 2, 91/1, 91/461

[56] References Cited

UNITED STATES PATENTS

| | | |
|---|---|---|
| 2,244,830 | 6/1941 | Doe et al. .......60/53 WW UX |
| 2,416,801 | 3/1947 | Robinson ..............60/53 WW |
| 3,057,162 | 10/1962 | Lee ........................60/53 WW |
| 3,416,452 | 12/1968 | Misulis..............60/52 VS UX |
| 3,458,053 | 7/1969 | Reuter...............60/53 WW X |

*Primary Examiner*—Edgar W. Geoghegan
*Attorney*—Karl F. Ross

[57] ABSTRACT

An overload safety system for a hydrostatically driven crane in which a valve assembly applies pilot fluid to a fluid-control main station which, in turn, shifts the hydrostatic drive out of its neutral position corresponding to the displacement of the control valve member. A reversing (changeover) valve connects the lines to opposite sides of the main value with an electrically operated relief valve, the latter being actuated by an electrical signal on overload to depressurize the pilot line and apply a brake to the power member of the crane.

10 Claims, 1 Drawing Figure

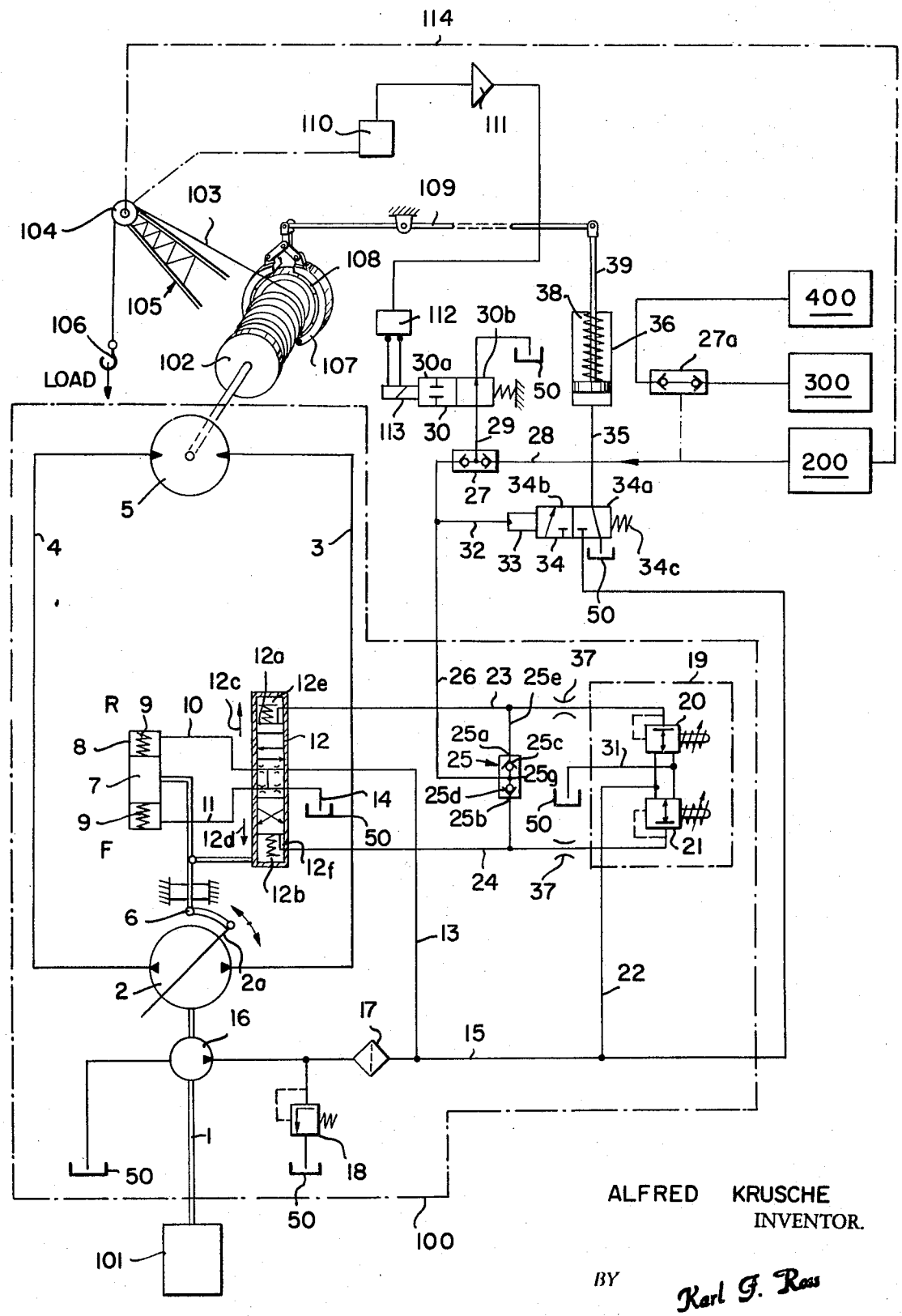

OVERLOAD SYSTEM FOR A HYDROSTATIC-DRIVE APPARATUS

FIELD OF THE INVENTION

My present invention relates to overload security systems for a hydraulic installation, especially a hydrostatic drive, and to overload networks in hydrostatic drives for cranes and the like which may have a plurality of hydrostatic circuits.

BACKGROUND OF THE INVENTION

In a hydrostatic drive, a hydrostatic motor, usually of the axial-piston type, is connected to a load, e.g., the windlass, lifting mechanism jib or boom of a crane or some other load to be powered by the motor.

An internal-combustion engine or other prime mover drives a hydrostatic pump, usually an axial-piston pump, whose high-pressure outlet side is connected to the inlet port of the motor while the outlet port of the hydrostatic motor is connected to the intake port of the pump, thereby creating a substantially closed hydraulic circuit between the pump and motor. Of course, the circuit may have leakage losses which may be replaced from a sump or reservoir. A hydrostatic drive of this type is described in commonly assigned U.S. Pat. No. 3,443,656.

To control the hydrostatic drive, the hydrostatic pump and/or the motor may be provided with a pivotal control member against which the angularly equispaced axially extending piston of the respective cylinder drives bear (see *Fluid Power*, U.S. Government Printing Office, Washington, D.C., 1966, Pages 109ff, 199ff, and 206ff.) The control plate or surface may thus be pivotal about an axis perpendicular to the axis of rotation of the piston barrel or cylinder drum and may swing from a neutral position, wherein the control surface is precisely perpendicular to the axis of rotation of the drum and the pistons have zero stroke, to tilted positions on either side of this neutral position corresponding to forward and reverse drive of the hydrostatic motor.

It is conventional to provide a servomotor means, e.g., a hydraulic cylinder arrangement, for displacing the control surface of the hydrostatic drive and this cylinder may be operated in turn from a three-position (pilot) valve having a central position corresponding to the neutral mode of the hydrostatic drive and a pair of extreme positions corresponding to the "forward" and "reverse" modes of the hydrostatic drive.

When such hydrostatic systems are used in cranes and the like, a number of networks may be provided, each network having at least its own hydrostatic motor and being supplied by its own hydrostatic pump or a pump common to all of these motors. The control systems are generally individual to the respective hydrostatic circuits.

For example, a typical hydrostatic crane may include a lifting mechanism or windlass for coiling the crane cable on a drum driven by one hydrostatic motor, may couple this hydrostatic motor to the system for pivoting the boom or jib of the crane or may provide another hydrostatic motor for this purpose, and may have still another hydrostatic motor or group of motors for operating the outriggers of the crane designed to support the latter against tilting upon operation of the boom or windlass. In fact, hydrostatic drives may also be provided, e.g., on mobile cranes, for rotating the turret, operating the wheels to transport the chassis from place to place, and means for leveling the crane even when the latter is positioned on irregular terrain.

While it has been proposed heretofore to provide devices for signaling the overload of a hydraulic system and a system for producing an electrical output to alert the crane operator to an overload of the lifting mechanism of a crane cannot be considered "new," such systems have not been successfully applied to an automatic overload-safety protection of the hydraulic circuit.

OBJECTS OF THE INVENTION

It is, therefore, the principal object of the present invention to provide an improved system for protecting a hydrostatic drive against overload.

It is another object of the invention to provide a hydrostatic drive for the lifting mechanism of a crane which is responsive to potential overloading and for providing automatic protection of the hydraulic system.

Still another object of this invention is to provide a crane having a hydrostatic system for operating the jib or boom member thereof and provided with means affording protection against excessive tilting of the boom.

Another object of this invention is to provide a hydrostatic drive for a crane or the like in which protection is afforded against any undesirable circumstance which can be represented as an electrical signal.

Still another object of this invention is to provide an improved safety system for a hydrostatic crane drive which uses simple valve components and is free from the complexities characterizing earlier systems.

SUMMARY OF THE INVENTION

These objects and others which will become apparent hereinafter are attained, in accordance with the present invention, with a hydrostatic drive having a hydrostatic motor connected to a load adapted to produce an electrical signal upon the development of an undesirable condition, a hydrostatic pump driven by a prime mover and connected in substantially closed circuit with the hydrostatic motor, and a drive-operating piston-and-cylinder arrangement having a double-acting piston which is connected with the control member of the hydrostatic pump-motor combination.

The control member may be shifted from a "neutral" position into "forward" and "reverse" positions under the control of a three-way valve having corresponding positions and constituting the drive-control valve according to the invention. The control valve is, in turn, operated by pilot-fluid pressure (control fluid) applied to opposite sides of the valve from a pilot-valve assembly which may be manually or electrically controlled and is preferably remote from the hydrostatic drive and connected to the drive-control valve by pilot-fluid lines.

According to the principles of the present invention, a changeover valve bridges these pilot-fluid lines between respective throttles communicating with the pilot-valve system and the drive-control valve, the changeover valve normally having an output pressure equal to the higher of the input pressure. The control conduit from this changeover valve, however, is connected to an electrically operable relief valve designed to vent the control line to low pressure upon generation of the aforesaid electrical signal, thereby draining the pressurized pilot-fluid line and automatically reversing the drive-control valve to eliminate the dangerous condition represented by the electrical signal. Advantageously, the driven member connected to the hydrostatic motor is provided with a brake which is released through a further venting or relief valve tied to the aforementioned control line.

Hence the invention can be considered as residing in the combination of the following features:

a. To both of the pilot-fluid lines, each of which is connected to a transmitter of a fluid-pressure signal to the drive-control valve, there is connected a changeover valve (or double-acting or back pressure check valve);

b. On the output or control line of the changeover valve, a relief valve is provided for operation by the warning signal to connect the control line to a low-pressure point, e.g., the reservoir, of the system; and c. In each of the pilot-fluid lines, between the changeover valve and the respective transmitter, a throttle is provided.

It is apparent that this system allows a single distributing valve, the drive-control valve, and a single changeover valve of relatively simple construction to provide both normal operation of the hydrostatic drive and emergency, inactivation of the latter as soon as overload occurs and without any significant delay. Furthermore, any number of hydrostatic power circuits may be connected to the control line, preferably via other changeover valves (or double-acting check valves) so that a signal applied to the relief valve will render all of the systems inoperative.

According to another feature of this invention, the hydrostatic drive is provided in a crane having two hydrostatic power circuits, e.g., the hydrostatic drive for operating the lifting mechanism and the hydrostatic drive for operating the outrigger mechanism, the latter being a jib, boom or the like. According to the principles of the present invention, the control line (output line) of the changeover valve is connected to a further changeover valve whose second inlet line is tied to the control line of the second hydrostatic drive, i.e., to the output line of its changeover valve, the output or control line side of this connecting changeover valve being tied to the relief valve. Since the electromagnetic valve is relatively expensive, only a single one of them is required to provide security for several systems of the crane.

DESCRIPTION OF THE DRAWING

The above and other objects, features and advantages of the present invention will become more readily apparent from the following description, reference being made to the drawing, the sole FIGURE of which is a hydraulic circuit diagram illustrating the invention.

SPECIFIC DESCRIPTION

In the drawing I show an internal-combustion engine 101, to the crankshaft 1 of which is connected a main hydraulic pump 2 forming the drive member of a hydrostatic power circuit including the hydrostatic motor 5. The pump and motor may be constituted as described in the aforementioned patent. Pump 2 has a control member 2a which is angularly displaceable to control the direction of movement of the hydrostatic motor 5 and the torque applied to the latter. Hydraulic lines 3 and 4 connect the opposite ports of the pump 2 with the corresponding ports of the motor 5.

The hydrostatic motor 5 is represented as being connected to the lifting system of a crane, the lifting system including at least one windlass or drum 102 upon which a cable 103 is wound, the cable passing over idlers 104 of a crane boom 105. A load may be applied at 106 to the end of the cable. Consequently, operation of the motor 5 may take up or pay out the cable to raise or lower the load. The drum 102 is shown to be formed with a brake surface 107 engageable by a brake shoe 108 whose actuating mechanism includes a lever 109 diagrammatically representing any brake actuating assembly. The idler 104 is provided with a sensor or detector 110 responsive to an overload to provide an electrical signal which is amplified at 111 and applied through a control circuit 112 to the electromagnetic coil 113 of a relief valve 30 to be described in greater detail hereinafter. A second power system, including, for example, a hydrostatic motor for raising and lowering the boom 105 is represented at 200, the connection to the boom being shown at 114. Additional hydrostatic drives may be provided at 300 and 400 for controlling other loads associated with crane operation.

The control member 2a is connected via linkage 6 to a double-acting piston 7 of a cylinder 8 containing two springs 9 biasing the piston 7 into its intermediate or neutral position. When the piston 7 is moved in one direction within cylinder 8, the control member 2a is shifted from its neutral position into its "forward drive" position while a displacement of the piston 7 in the opposite direction from its neutral position, shifts the control member 2a into the "drive" position.

Hydraulic lines 10 and 11 connect the opposite chambers of the cylinder 8 to the discharge ports of a four-port three-position distribution valve 12, the other ports of which are connected respectively to the reservoir 50 and to a source of control pressure represented by the auxiliary pump 16. With the valve member 12a in the position illustrated, effective fluid flow to and from the cylinder 8 is blocked since flow from pump 16 is bypassed by the valve member 12a back to the reservoir and the system remains in its neutral position.

A pair of springs 12b bias the valve member 12a into its neutral position. Movement of the valve member 12a in the direction of arrow 12c however, will permit fluid flow from the pump 16 through line 11 into the cylinder 8 while line 10 conducts fluid from the cylinder to the reservoir. The piston 7 is thus shifted upwardly into the reverse position. Conversely, movement of the valve member 12 in the direction of arrow 12d will connect line 13 with line 10 and line 14 with line 11 to shift the piston 7 downwardly into its forward position.

It will be apparent that the line 13 of valve 12 is connected to the line 15 of auxiliary or control fluid pump 16 connected to the shaft 1 and drawing fluid from the reservoir 50. A filter 17 is disposed at the discharge side of the pump 16 and a pressure relief valve 18 is provided at the discharge side as well to maintain the control pressure substantially constant. The valve 12, moreover, provides chambers 12e and 12f communicating respectively with pilot-fluid lines 23 and 24 and adapted to be pressurized to drive the valve body 12a in the direction of the unpressurized compartment.

A transmitter-valve arrangement 19 may be provided at a location remote from the hydrostatic drive and includes a pair of pilot-pressure transmitting valves 20 and 21 connected to a common source 22 of control pressure, i.e., the line 15. The valves 20 and 21 which can be coupled for reciprocal operation so that one delivers pressure to the corresponding pilot-fluid line while the other conducts fluid from its pilot-fluid line to the reservoir, may be manually or electrically operated. As already noted, the lines 23 from transmitter 20 and 24 from transmitter 21 are connected to the drive-control valve 12 remote from the pilot valve assembly 19.

Between the pilot-fluid lines 23 and 24, I provide a changeover valve 25 which may be of the double-acting check valve type. As illustrated in the Figure, the valve 25 has a pair of inlet ports 25a and 25b which are provided with check valve members 25c and 25d effective to prevent flow from the valve to the respective inlet lines 25e and 25f but also to block fluid flow in either direction when the pressure behind these check members is relatively high or substantially equal to the pressure at inlets 25a and 25b. A light spring 25g may be provided between the check members. A control line or back pressure line 26 communicates with the valve between the check members and receives the control pressure. When the hydraulic pressure in line 26 is low and the pressure in either line 23 or 24 is higher, the corresponding check will be displaced and a flow path established between the higher pressure line and the control line 26. When the back pressure in line 26 is approximately equal to the pressure in the high-pressure in the line, further flow across the check terminates. When the pressure in either of the inlet lines is less than the back pressure, however, there is no fluid flow through the valve.

The control line 26 is connected with one inlet of a further changeover valve 27, the output or back pressure line 29 of which is connected to the electromagnetic relief valve mentioned earlier. To the changeover valve 27, there is also connected, via line 28, the back pressure or control line 26 of the other hydraulic drive circuit 200, i.e., the circuit controlling the jib or boom. A further overload signal system may be provided to produce an output upon excessive tilting of the boom, thereby triggering the valve 30.

In so far as the crane may be provided with further hydrostatic drive circuits, the line 28 may be connected to the output or back pressure sides of further control valves 27a for example, whose input sides are connected with the lines of the additional hydrostatic drives 300 and 400. The drive complex contemplated at 200, 300 or 400 may be similar to that represented at 100 in the drawing.

As soon as the electromagnetic coil of valve 30 is de-energized, line 29 remains blocked in the position 30a of the valve 30. When, however, an electric signal is applied to this coil, valve position 30b is rendered effective and line 29 is connected with a pressureless return 31 to the reservoir 50. As indicated earlier, the electromagnet is energized by a detector or sensor responsive to overload of the lifting mechanism or excessive tilt of the jib and the boom.

Control or back pressure line 26 is also connected via line 32 to a two-port, two-position distribution valve 34 having a hydraulic actuating cylinder 33. In position 34a of this valve, corresponding to the depressurized state of the cylinder 33, a line 35 connected to the brake cylinder 36 is drained to the reservoir 50. In position 34b however, hydraulic pressure from line 35 is applied to the brake cylinder 36 to compress the spring 38 thereof. The piston 39 of this cylinder is connected to the linkage 109 so that, when the cylinder is depressurized, the spring 38 applies the brake 108.

In each of the pilot-fluid lines 23 and 24, between the transmitter 20 or 21 and the changeover valve 25, is provided a throttle 37.

The transmitter arrangement 19 is provided with pilot-pressure transmitting valves 20 and 21 which are so designed as to be of the quick-break valve type, i.e., develop a predetermined minimum pressure in the respective lines 23, 24 which is sufficient to operate valve 33 substantially instantaneously after operation of the transmitter valve 20 or 21. This ensures that, immediately upon actuation of the transmitter valve 20 or 21, the brake will release and permit normal operation. However, since it is also desireable to provide fine control of the hydrostatic drive via the valve 12, I provide the valves 20 and 21 such that any displacement beyond the initial cracking to achieve the aforementioned minimum pressure, produces a small increase in fluid displacement per unit of travel of valve member 20 or 21.

OPERATION

When the transmitter valve 20 is actuated, line 22 is instantaneously connected with line 23 through the throttle 37 and, since valve 20 is of the quick-break type, the necessary minimum pressure is applied via the changeover valve 25 and line 26 to the cylinder 33 to shift valve 34 into its position 34b and connect the cylinder 36 with line 15 to release the brake 108. It should be understood that this sequence occurs substantially instantaneously with actuation of the valve 20, but that the back pressure in line 26 may suffice to maintain the valve 34 in its position 34b should valve 30 have been previously positioned at 30a in accordance with normal operation.

Operation of the valve 20 simultaneously delivers pilot-fluid pressure via line 15 from the auxiliary pump 16 to the compartment 12e of the three-way valve 12 to shift the valve member 12a in the direction of arrow 12d and connect line 10 with conduit 13 and the pump 16.

The compartment above the piston 7 is thereby pressurized and the piston 7 displaced into its forward position F, thereby swinging the control member 2a of the pump 2 via the linkage 6. The hydrostatic motor 5 is then driven in its forward direction, e.g., to lift the load 106 and raise the cable 103 of the crane.

Should an excessive load be detected, an electrical signal is produced at 110 –112 and is applied to the electromagnet 113 of the relief valve 30 which, as noted, has a pressureless line 31 connected to the reservoir 50. The valve 30 is thus switched into its position 30b to connect line 26 with the reservoir 50 and thereby drain the back pressure from this control line 26. Consequently, pressure from line 23, generated because of the actuation of valve 20, will bleed through the changeover valve 25, thereby dropping the pressure in compartment 12e of valve 12 and allowing the springs 12b to restore the latter to its intermediate or neutral position. In this neutral position, both lines 10 and 11 are connected to the reservoir 14 and are relieved of pressure so that springs 9 urge the piston 7 into its neutral position, thereby terminating flow of fluid to the motor 5. The valve 12 to this end has a central position in which all of the lines 10, 11, 13 and 14 are interconnected through throttles to allow for a slow depressurization. The throttle associated with line 13 is dimensioned to maintain therein a back pressure of at least 12 atmospheres so that reactivation of the valve 12 remains possible.

The pressure drop in line 26 is communicated to line 32, whereupon the spring 34c urges the valve 34 into its position 34a and drains the cylinder 36 to the reservoir 50. The spring 38 of the cylinder 36 is thereby relieved and immediately applies the brake 108 to lock the mechanism against further displacement. The allowable load cannot, therefore, be exceeded. Operation of valve 21, of course, causes the system to react similarly. Of course, when no overload is present, valve 30 will remain in position 30a and back pressure will develop in line 26 sufficient to release the brake 108 and permit the valve 20 and 21 to control the valve 12 with precision.

When, of course, only a single hydrostatic drive is provided, the changeover valve 27 can be eliminated and line 26 connected directly to line 29.

The undesired condition to which the valve 30 reacts is here shown to concern the load. Too large a load is, however, not the only condition to which the apparatus need respond since it is entirely possible, for instance, that relatively small load can be safely lifted but then create a dangerous situation when the boom is swung out, thereby creating a large moment capable of tipping over the crane. Similarly, when some relatively small cranes are provided with extremely long booms the simple inclination of these booms away from a nearly vertical position can constitute a danger even when no load is being lifted. A dead-man switch might also be provided to shut down the crane should something happen to the operator, or some other switch responding to another emergency condition, e.g., overheating of the motor 101, can be provided.

The motor 2 can be nonreversible in which case the valve 12 has only one position other than its central, neutral position. In such a system only one pilot-fluid line is necessary, which can be connectable directly through the valve 30 to the reservoir 50. Of course, changeover valves are necessary if more than one drive system is to be controlled by a single valve 30 which itself need not necessarily be electric.

It is also possible that the pump and motor need not be connected in a closed power circuit. They both can be connected on one side to an unpressurized reservoir which is common with all of the other drives.

The improvement described and illustrated is believed to admit of many modifications within the ability of persons skilled in the art, all such modifications being considered within the spirit and scope of the invention except as limited by the appended claims.

I claim:

1. A hydrostatic drive for a load, comprising:
   a hydrostatic pump and a hydrostatic motor connected in a power circuit and coupled with said load while being provided with a control member shiftable into and out of a neutral position;
   a control unit for said power circuit and including a piston-and-cylinder arrangement operatively connected to said member, a distributing valve connected to said piston-and-cylinder arrangement for controlling fluid flow thereto to displace said member, and pressure-transmitting means connected to said distributing valve for applying pressure to opposite sides thereof via respective pilot-fluid lines to operate said valve and effect displacement of said member;
   a changeover valve having a pair of inlets each connected to a respective one of said lines and a control line relievable to bleed pressure from said pilot-fluid lines;
   a relief valve communicating with said control line and energizable to relieve the pressure therein;
   means responsive to the development of an undesired condition concerning said load for energizing said relief valve to bleed the pressurized one of said pilot-fluid lines; and
   a throttle in each of said pilot-fluid lines between said pressure-transmitting means and said distributing valve.

2. The hydrostatic drive defined in claim 1 wherein said pressure-transmitting means includes a respective control valve connected between a source of fluid pressure and each of said pilot-fluid lines.

3. The hydrostatic drive defined in claim 2 wherein said control valves are each of the quick-break type.

4. The hydrostatic drive defined in claim 1 for a crane having a plurality of such drives each connected to a respective load, further comprising an additional changeover valve having a pair of inlets each connected to the control line of the first-mentioned changeover valve of each of said hydrostatic drives said additional changeover valve having a control line connected to said relief valve.

5. The hydrostatic drive defined in claim 1 further comprising a brake for locking said load, a cylinder pressurizable to release said brake, and a brake valve responsive to the pressure in said control line for connecting the last-mentioned cylinder with a source of fluid pressure, said brake valve draining said last-mentioned cylinder upon the relief of pressure in said control line.

6. The hydrostatic drive defined in claim 1 wherein said pressure-transmitting means includes a respective quick-break control valve connected between a source of fluid pressure and each of said pilot-fluid lines, said source being an auxiliary pump, said relief valve being an electromagnetic valve electrically energized by the means responsive to the development of said undesired condition.

7. The hydrostatic drive defined in claim 1 for a crane having a plurality of such drives each connected to a respective load, one of said drives being an lifting mechanism, said means responsive to the development of an undesired condition being an overload detector connected to said lifting mechanism.

8. The hydrostatic drive defined in claim 1 for a crane having at least two such drives, said crane having a boom controlled by one of said drives, the control lines of said hydrostatic drives being connected to respective inlets of at least one additional changeover valve, said relief valve being communicating with the control line of said additional changeover valve.

9. The hydrostatic drive defined in claim 8, further comprising an internal combustion engine for driving said pumps.

10. A hydrostatic drive for a load, comprising:

a hydrostatic pump and a hydrostatic motor connected in a power circuit and coupled with said load while being provided with a control member shiftable into and out of a neutral position;

a control unit for said power circuit and including a piston-and-cylinder arrangement operatively connected to said member, a distributing valve connected to said piston-and-cylinder arrangement for controlling fluid flow thereto to displace said member, and a pilot-fluid line connected to said distributing valve and pressurizable for displacing said member;

means for pressurizing said pilot-fluid line;

a relief valve communicating with said pilot-fluid line and energizable to relieve the pressure therein;

means responsive to the development of an undesired condition for energizing said relief valve to bleed said pilot-fluid line and thereby shift said member into said neutral position; and a throttle in said pilot-fluid line between said energizing means and said relief valve.

* * * * *